(12) United States Patent
Biswas et al.

(10) Patent No.: US 11,218,547 B2
(45) Date of Patent: Jan. 4, 2022

(54) METHOD AND SYSTEM FOR DELIVERING DYNAMICALLY CREATED CONTENT TO HMI OF A VEHICLE

(71) Applicant: Wipro Limited, Bangalore (IN)

(72) Inventors: Nilanjan Biswas, Newtown (IN); Suranjit Dutta, Kalikapur (IN); Sandip Ghatak, Kestopur (IN); Ananda Jana, Panchpota (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/940,527

(22) Filed: Jul. 28, 2020

(65) Prior Publication Data

US 2021/0306421 A1    Sep. 30, 2021

(30) Foreign Application Priority Data

Mar. 30, 2020  (IN) .............................. 202041013858

(51) Int. Cl.
*G06F 15/16*    (2006.01)
*H04L 29/08*    (2006.01)

(52) U.S. Cl.
CPC .............. *H04L 67/12* (2013.01); *H04L 67/20* (2013.01)

(58) Field of Classification Search
CPC ................................ H04L 67/12; H04L 67/20
See application file for complete search history.

(56) References Cited

U.S. PATENT DOCUMENTS

| 8,912,978 | B2  | 12/2014 | Szczerba et al. |
| 9,760,541 | B2  | 9/2017  | Richman et al. |
| 9,975,429 | B2  | 5/2018  | Chen et al. |
| 2018/0365533 | A1* | 12/2018 | Sathyanarayana ....... G06N 3/04 |
| 2019/0279447 | A1* | 9/2019  | Ricci ...................... B60Q 9/00 |

* cited by examiner

*Primary Examiner* — Normin Abedin
(74) *Attorney, Agent, or Firm* — Finnegan, Henderson, Farabow, Garrett & Dunner, LLP (57) ABSTRACT

Embodiments of the present disclosure relate to a method (300) and a system (103) for delivering content to a Human Machine Interface (HMI) (101) of a vehicle (100). The system (103) receives a content to be delivered from a third-party application server (104), and vehicle and other data when an event occurs. Once the content is received, the system (103) determines a driver distraction score for the content based on the received data and one or more driver distraction rules defined by an OEM server (102). Further, the system (103) creates a content package based on the driver distraction score and the received data. Further, the system assigns a priority score to the content package based on a type of event. Thereafter, the system delivers the content package to the vehicle for providing to the HMI.

16 Claims, 7 Drawing Sheets

METHOD AND SYSTEM FOR DELIVERING DYNAMICALLY CREATED CONTENT TO HMI OF A VEHICLE

TECHNICAL FIELD

The present disclosure relates in general to delivering services to vehicle, and in particular, the present disclosure relates to delivering content to Human Machine Interface (HMI) of a vehicle.

BACKGROUND

Driving assistance information or crucial information about the vehicle is essential to a driver of the vehicle. Timely and appropriate notification has to be communicated to the driver. Modern day vehicles (cars, trucks etc.) are equipped with advanced sensors and Human Machine Interface (HMI) systems. Generally, the HMI systems display information originating within the vehicle. In addition, Original Equipment Manufacturer (OEM) allow third-party applications to provide content to the HMI systems of the vehicle. The third-party applications collect vehicle data from the OEM and create content to be provided to the HMI. For example, a storm notification or rainy weather may be indicated by water droplets on an infotainment system or a Head-Up Display (HUD) of the vehicle. However, a third-party application may create high graphic content displaying a rainy condition along with thunderstorms. Likewise, the third-party applications may also provide content associated with the vehicle data. For example, the third-party application may collect vehicle location data and may provide nearby offers.

However, not all information generated by the third-party applications can be provided to the HMI systems due to lack of ancillary data, lack of display space and low processing power in the vehicle. Thus, in the current HMI systems in the vehicle, there are restrictions to the scope and extent of creation of notifications and delivery of content provided to the HMI systems.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method for delivering content to a Human Machine Interface (HMI) of a vehicle. The method comprises receiving a content from a third-party application server among a plurality of third-party application servers for delivering to the HMI of the vehicle, and data related to at least the HMI of the vehicle, an environment around the vehicle, a network associated with the vehicle, user preferences and measurements made by one or more sensors in the vehicle from an Original Equipment Manufacturer (OEM) server, when an event occurs. The method further comprises determining a driver distraction score for the content based at least on the received data and one or more driver distraction rules defined by the OEM server. Thereafter, the method comprises creating a content package for the content, suitable for delivering to the HMI of the vehicle, based on the driver distraction score and the received data. Furthermore, the method comprises assigning a priority score to the content package based on a type of the event and delivering the content package to the vehicle for providing to the HMI based on the priority score.

In an embodiment, the present disclosure discloses a content delivery system for delivering content to a Human Machine Interface (HMI) of a vehicle. The content delivery system comprises one or more processors and a memory. The one or more processors are configured to receive a content from a third-party application server among a plurality of third-party application servers for delivering to the HMI of the vehicle, and data related to at least the HMI of the vehicle, an environment around the vehicle, a network associated with the vehicle, user preferences and measurements made by one or more sensors in the vehicle from an Original Equipment Manufacturer (OEM) server, when an event occurs. The one or more processors are further configured to determine a driver distraction score for the content based at least on the received data and one or more driver distraction rules defined by the OEM server. Thereafter, the one or more processors are configured to create a content package for the content, suitable for delivering to the HMI of the vehicle, based on the driver distraction score and the received data. Furthermore, the one or more processors are configured to assign a priority score to the content package based on a type of the event and deliver the content package to the vehicle for providing to the HMI based on the priority score.

In an embodiment, the present disclosure relates to a non-transitory computer readable medium including instructions stored thereon that when processed by at least one processor cause a device to perform operations comprising receiving a content from a third-party application server among a plurality of third-party application servers for delivering to the HMI of the vehicle, and data related to at least the HMI of the vehicle, an environment around the vehicle, a network associated with the vehicle, user preferences and measurements made by one or more sensors in the vehicle from an Original Equipment Manufacturer (OEM) server, when an event occurs. The operations further comprises determining a driver distraction score for the content based at least on the received data and one or more driver distraction rules defined by the OEM server. Thereafter, the operations further comprises creating a content package for the content, suitable for delivering to the HMI of the vehicle, based on the driver distraction score and the received data. Furthermore, the operations further comprises assigning a priority score to the content package based on a type of the event and delivering the content package to the vehicle for providing to the HMI based on the priority score The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and a system for delivering content to a Human Machine Interface (HMI) of a vehicle. The system receives a content to be delivered from a third-party application server, and data related to the HMI in the vehicle, environment around the vehicle, a network associated with the vehicle, user preferences and data from sensors installed in the vehicle. The third-party application server may also be privy to the data received by the system. The system and the third-party application server may receive the data from an Original Equipment manufacturer (OEM) server. The content is provided by the third-party application server to the system when an event occurs. The event may be a low fuel measurement, a low tyre pressure measurement, a harsh weather around the vehicle and the like. Once the system receives the content, the system determines a driver distraction score for the content based on the received data and one or more driver distraction rules defined by the OEM server. Further, the system creates a content package based on the driver distraction score and the received data. The content package is created to suit the requirements of the HMI in the vehicle. Also, the content package is created based on network bandwidth between the OEM server and the vehicle. Further, the system assigns a priority score to the content package based on a type of event. For example, an emergency event may be provided with a high priority score. Thereafter, the system delivers the content package to the vehicle for providing to the HMI. Hence, the present disclosure enables optimized delivery of content to the HMI, and provides safety to the drivers.

Figure 1:
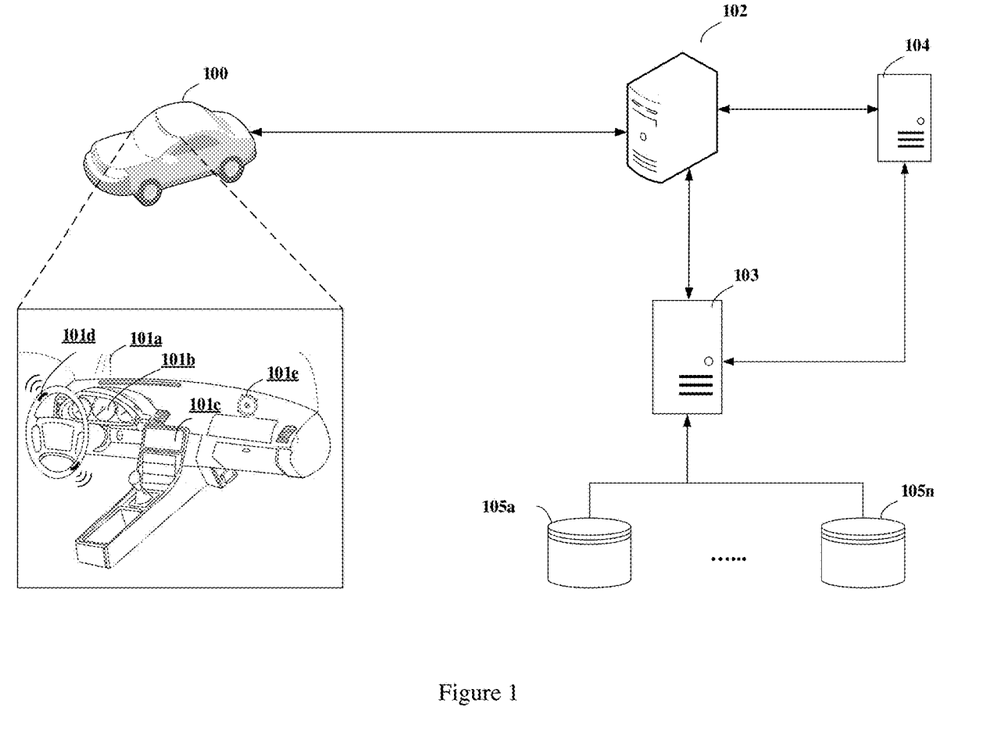
FIG. 1 illustrates an environment for delivering content to HMI of a vehicle, in accordance with an embodiment of the present disclosure.

FIG. 1 is illustrative of an environment of vehicle communication with remote server. FIG. 1 shows a vehicle (100), an Original Equipment Manufacturer (OEM) server (102), a content delivery system (103), a third-party application server (104), and one or more databases (105a, . . . 105n). In an embodiment, the vehicle (100) may include, a plurality of HMI enabled components such as, but not limited to, a Head-Up display (101a), an odometer (101b), an infotainment system (101c), a haptic device (101d) and a speaker (101e). The HMI enabled components (101a, 101b and 101c) may be collectively referred as HMI (101) in the present disclosure.

The vehicle (100) may be in communication with the OEM sever (102). An OEM may be a manufacturer of the vehicle (100) or an organization authorized to act on behalf of the manufacturer. Typically, the vehicle (100) may share data to the OEM server (102) for analysis. For example, the vehicle (100) may share fuel and mileage data to the OEM server (102). Likewise, the vehicle (100) may share critical notifications such as service due dates, condition of automotive parts in the vehicle (100) and the like. The vehicle (100) may be communicatively connected to the OEM server (102) via a network (not shown in FIG. 1). In an embodiment, the vehicle (100) may be connected to the OEM server (102) via a mobile communication network (e.g., Long Term Evolution (LTE) or General Packet Radio Services (GPRS)). The mobile communication network may be configured in the vehicle (100) by means of a Subscriber Identity Module (SIM) card provided in the vehicle (100). In an embodiment, the vehicle (100) may be connected to a device such as a smart phone via communication protocols such as Bluetooth, Wireless-Fidelity (WI-FI), Near Field Communication (NFC), and the device may be used to communicate vehicle data to the OEM server (102). In an embodiment, the vehicle (100) may send data including, but not limited to, to HMI (101), measurements made by a plurality of sensors (not shown in the FIG. 1) in the vehicle, a network associated with the vehicle (100) and user preferences set by a driver in the vehicle (100), to the OEM server (102). In an embodiment, the vehicle (100) may generate a unique session Identity (ID) for each ride. The vehicle data sent to the OEM server (102) may be mapped to the unique session ID. In an embodiment, the vehicle (100) may also send Vehicle Identification Number (VIN), model name, chassis number, engine number and the like to the OEM server (102), along with the above data.

In an embodiment, the OEM server (102) may be associated with the third-party application server (104) (although one application server (104) is shown in FIG. 1, it should be apparent to a person skilled in the art that many such third-party application servers can be connected to the OEM server (102)). The third-party application server (104) may use the data received from the vehicle to provide various services and enhanced notification. For example, the third-party application server (104) may receive location data comprising live location of the vehicle (100) from the OEM server (102) and provide services such as offers near the vehicle (100), restaurant suggestions and the like. Likewise, the third-party application server (104) may receive vehicle performance details such as engine details, details regarding distance travelled by the vehicle (100), and the like, and provide notifications regarding servicing of the vehicle (100). A person skilled in the art should appreciate that the services are not limited to example given above, and may include other services based on the data received from the vehicle (100). In an embodiment, the third-party application server (104) may be connected to the one or more databases (105a, . . . 105n) (connection not shown in FIG. 1). The one or more databases (105a, . . . 105n) may include, but not limited to, a weather database, a road traffic database, a service database, and the like. The third-party application server (104) may provide appropriate content to be notified using the HMI (101) based on the data received from the OEM server (102) and the one or more databases (105a, . . . 105n). In an embodiment, the third-party server (104) may provide the appropriate content in response to an event. In the example provided above, the offers nearby the vehicle location may be in response to a current location of the vehicle (100). In an embodiment, the event may be generated in the vehicle (100) (e.g., oil leakage) or outside the vehicle (e.g., weather forecast).

In an embodiment, the content delivery system (103) may be configured to deliver appropriate content to the HMI (101) of the vehicle (100). The content delivery system (103) may be connected to the OEM server (102), the third-party application server (104) and the one or more databases (105a, . . . 105n). The content delivery system (103) may receive the content from the third-party application server (104) when the event occurs. Further, the content delivery system (103) analyses the content and modifies the content to suit the requirements of the HMI (101) to avoid distraction to the driver of the vehicle (100). In an embodiment, the functions of the content delivery system (103) may be implemented in the OEM server (102) or may be implemented as a stand-alone system. A person of ordinary skills in the art should appreciate that the steps performed by the content delivery system (103) may vary when the OEM server (102) implements the functions of the content delivery system (103). The content delivery system (103) may receive vehicle data from the OEM server (102) and data related to environment around the vehicle from the one or more databases (105a, . . . 105n). The analysis on the content to be provided to the HMI (101) are performed based on the vehicle data, the data related to the environment and one or more driver distraction rules. The one or more driver distraction rules may be rules provided by the OEM server to ensure safety of the driver while driving the vehicle (100). In an embodiment, the one or more driver distraction rules may vary for each vehicle.

Figure 2:
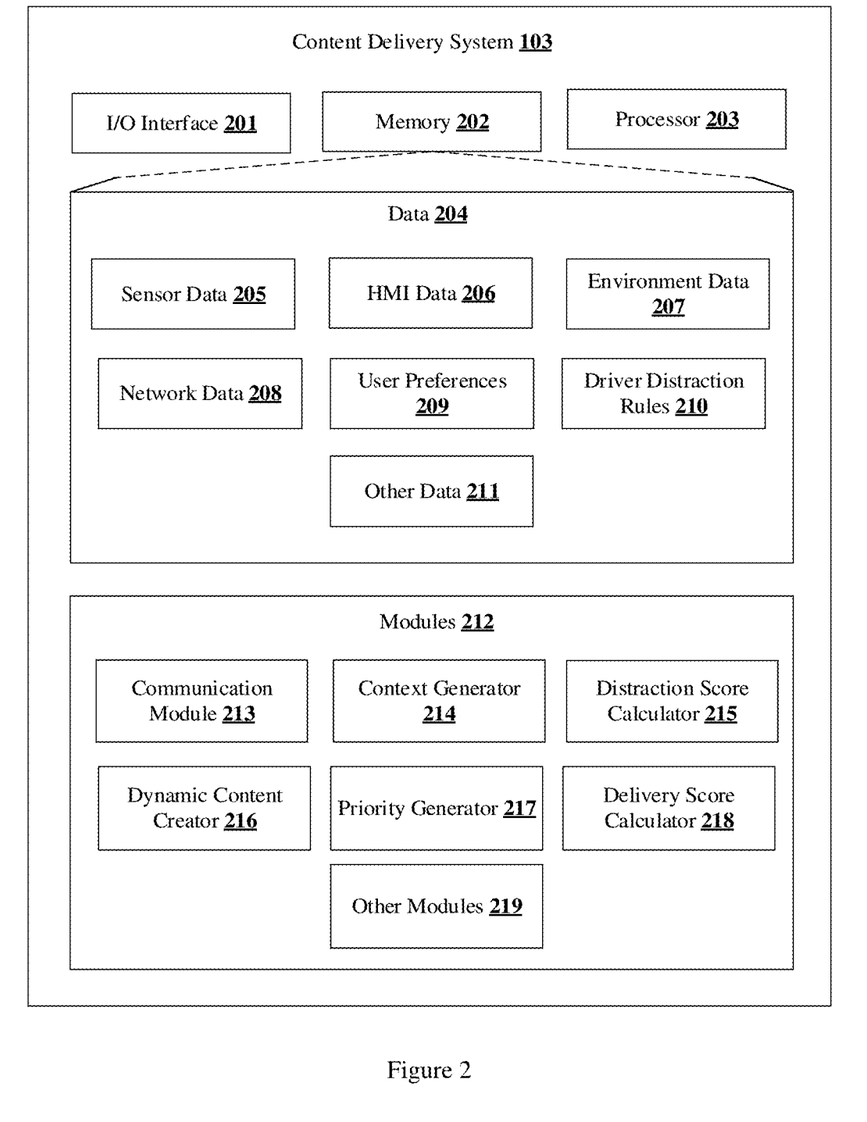
FIG. 2 shows an exemplary block diagram of a content delivery system for delivering content to HMI of a vehicle, in accordance with an embodiment of the present disclosure.

FIG. 2 illustrates internal architecture of the content delivery system (103) in accordance with some embodiments of the present disclosure. The content delivery system (103) may include at least one Central Processing Unit ("CPU" or "processor") (203) and a memory (202) storing instructions executable by the at least one processor (203). The processor (203) may include at least one data processor for executing program components for executing user or system-generated requests. The memory (202) is communicatively coupled to the processor (203). The content delivery system (103) includes an Input/Output (I/O) interface (201). The I/O interface (201) is coupled with the processor (203) through which an input signal or/and an output signal is communicated.

In an embodiment, data (204) may be stored within the memory (202). The data (204) may include, for example, sensor data (205), HMI data (206), environment data (207), network data (208), user preferences (209), driver distraction rules (210) and other data (211).

In an embodiment, the sensor data (205) may include, but not limited to, measurements made by one or more sensors installed in the vehicle (100). For example, the one or more sensors may include, but are not limited to, a speed sensor, an accelerometer, a tyre sensor, a temperature sensor, a door sensor, a camera, a Global Positioning System (GPS) and the like. The speed sensor may measure a speed of the vehicle (100), the accelerometer may measure an acceleration of the vehicle (100), a tyre sensor may measure a pressure of air in the tyre of the vehicle (100), the temperature sensor may measure the temperature of an engine of the vehicle (100), the door sensor may measure a status of a door in the vehicle (100), the camera may be used to measure distraction of the driver, the GPS may measure a location of the vehicle (100). Several other sensors not mentioned in the present disclosure may also fall within the list of sensors, and such data may also be received by the content delivery system (103).

In an embodiment, the HMI data (206) may include, but are not limited to, dimensions of the HMI (101), a type of the HMI (101), features of the HMI (101), and availability of the HMI (101). The dimensions may include a screen size and a resolution of the HMI (101). The type of HMI (101) may include display only, display and voice, and voice only. The features of the HMI (101) may include, colors supported by the HMI (101), types of data supported by the HMI (101), graphics supported by the HMI (101), and the like. The availability of the HMI (101) may be a current status of the HMI (101). The status may indicate if the HMI (101) is currently in use or idle.

In an embodiment, the environment data (207) may include, but are not limited to, weather around the vehicle (100), traffic around the vehicle, and a type and condition of a road.

The network data (208) may include, but are not limited to, data related to the network comprising a type of network, a bandwidth of the network, a latency of the network, and a number of channels in the network.

In an embodiment, the user preferences (209) may include, but are not limited to, a type of content preferred by the user, a preference regarding the type of HMI (101), an amount of content, time slots for delivering the content on the HMI (101), a priority of content set by the user, and permissions for each of the plurality of third-party application servers to access the HMI (101) of the vehicle (100).

In an embodiment, the driver distraction rules (210) includes one or more rules defined by the OEM to avoid distraction to the driver of the vehicle (100). The driver distraction rules (210) may vary for each vehicle. An example of the driver distraction rules (210) may include, to display notification icons and reduce textual notifications on the infotainment system. This reduces the distraction of the driver as the efforts made by the driver to read a notification is less compared to see an icon and understand the notification. Likewise, several such driver distraction rules (210) may be defined by the OEM. In an embodiment, the one or more rules may be defined dynamically based on a current situation of the vehicle (100). For example, when a vehicle (100) is in a hilly situation, which is not defined in the existing rules, the OES server (102) may determine the conditions around the vehicle and dynamically define one or more additional rules based on the situation.

The other data (211) may include permissions provided to the third-party applications by the OEM server. The permission may be related to amount of content third-party applications can provide, frequency of content provided, type of content provided by the third-party applications and the like.

In an embodiment, the data (204) in the memory (202) is processed by modules (212). As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The modules (212) when configured with the functionality defined in the present disclosure will result in a novel hardware.

In one implementation, the modules (212) may include, for example, a communication module (213), a context generator (214), a distraction score calculator (215), a dynamic content generator (216), a priority generator (217), a delivery score calculator (218) and other modules (219). It will be appreciated that such aforementioned modules 209 may be represented as a single module or a combination of different modules.

In an embodiment, the communication module (213) may be configured to facilitate communication between the content delivery system (103) and the OEM server (102), and the content delivery system (103) and the third-party application server (104). The communication module (213) may receive the content to be provided to the HMI (101) from the third-party application server (104) when an event occurs. Further, the communication module (213) may receive the sensor data (205), the HMI data (206), the network data (208), the user preferences (209) and the driver distraction rules (210) from the OEM server (102), and the environmental data (207) from the one or more databases (105a, . . . 105n). In an embodiment, the communication module (213) may pre-process the received data. Pre-processing may include, at least one of, normalizing the values associated with the received data, reducing noise in the data, and formatting the received data.

In an embodiment, the context generator (214) may be configured to receive the content to be provided to the HMI (101) from the communication module (213) and determine a context of the content. The context of the content may be determined using existing techniques. For example, Natural Language processing (NLP) technique may be used to determine the context of the content. For example, when the received content is related to displaying puncture shops nearby the vehicle (100), the context generator (214) may analyse the content and determine that the content is related to displaying puncture shops to the driver. Likewise, the context generator (214) may determine if the data is related to offers provided on shopping apparels nearby the location of the vehicle (100).

In an embodiment, the driver distraction score calculator (215) may be configured to determine a driver distraction score for the content to be provided to the HMI (101). The driver distraction score calculator (215) may use the data received from the vehicle (100), the data received from the one or more databases (105a, . . . 105n) and the driver distraction rules (210) to determine the score. In an embodiment, driver distractions score calculator (215) may consider the driver distraction rules (210) to determine the distraction of the driver. In an embodiment, imaging units inside the vehicle (100) may be used to determine the driver distraction score.

In an embodiment, the dynamic content creator (216) may be configured to create a content package dynamically (or in real-time) for the content received from the third-party application server (104). The content package may be suitable for delivering to the HMI (101). For example, the content received from the third-party application server (104) may be parsed according to the dimensions of the HUD (101a). Another example may include, content received from the third-party application server (104) in a mp4 format, and the dynamic content creator (216) may format the audio content to mp3 format supported by audio system of the vehicle (100). Another example may include, reducing graphics in the content according to graphics supported by the infotainment system (101c). In an embodiment, the dynamic content creator (216) may create the content package when the driver distraction score is below a threshold value.

In an embodiment, the priority generator (217) may be configured to assign a priority score to the content package based on a type of the event. For example, an event such as an oil leakage is important and the content to be provided to the HMI (101) in response to such an event also carries high importance. Hence, content related to highly important event is provided with a high importance score. The priority generator (217) may further consider an importance score set by the third-party applications server (104) to the content and an importance score associated with a plurality of third-party content provided by the plurality of third-party servers and a relative comparison between the importance score of the content and the importance score of the plurality of contents for assigning the priority score to the content package. In an embodiment, the third-party application server (104) may set the importance score to the content based at least on a type of content, target HMI, and one or more application rule defined by the third-party application server (104).

In an embodiment, the delivery score calculator (218) may be configured to determine a delivery score for the content package based at least on the priority score associate with the content package, a current content present in the HMI (101), the user preferences (209) and the received data. The delivery score calculator (218) may place the content package in a queue for delivering to the HMI (101) based on the delivery score.

In an embodiment, the other modules (219) may include, but are not limited to a notification module and a report generation module. The notification module may be configured to notify the OEM server (102) and the third-party application server (104) when the content has a driver distraction score above the threshold value. The report generation module may be configured to generate a report including content being provided to the HMI, types of events generated in the vehicle (100), distraction caused to the driver, and the like for analysis. The analysis may be further used to optimize the content selection while providing the content to the HMI (101).

Figure 3:
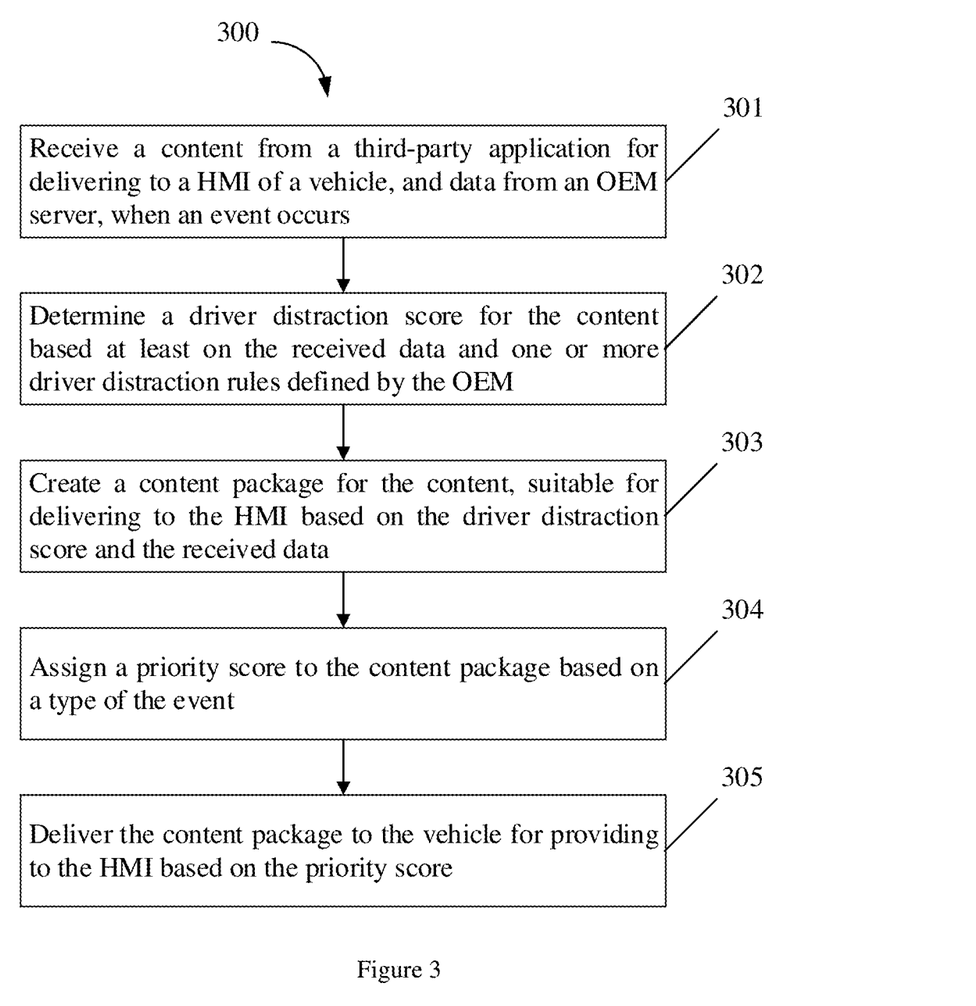
FIG. 3 shows an exemplary flowchart for delivering content on HMI of a vehicle, in accordance with an embodiment of the present disclosure.

FIG. 3 shows a flow chart illustrating a method (300) for delivering content to HMI (101) of the vehicle (100), in accordance with some embodiments of the present disclosure.

As illustrated in FIG. 3, the method (300) may comprise one or more steps. The method (300) may be described in the general context of computer executable instructions. Generally, computer executable instructions can include routines, programs, objects, components, data structures, procedures, modules, and functions, which perform particular functions or implement particular abstract data types.

The order in which the method (300) is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step (301), receiving, by the content delivery system (103), the content from the third-party application server (104) among a plurality of third-party application servers for delivering to a HMI (101) of the vehicle (100), and the data. The data is related to at least the HMI of the vehicle, an environment around the vehicle, a network associated with the vehicle, user preferences and measurements made by one or more sensors in the vehicle from an Original Equipment Manufacturer (OEM) server (103). In an embodiment, the data and the content are received when the event occurs. In an embodiment, the content is received in response to the occurrence of the event. For example, the event may include, but are not limited to, a decrease in engine oil in the vehicle (100), a harsh weather around the vehicle (100), decreased air pressure in tyres, a current location of the vehicle and the like. In an embodiment, the driver may have subscribed to a plurality of third-party applications. The plurality of the third-party applications may be hosted by the plurality of third-party application servers. An example of the third-party application may be a media application providing audio and video services. The media application may be hosted in the third-party application server (104). Further, the OEM server (102) may allow certain data to be shared with the media application. Further, the driver/occupant of the vehicle (100) may further set user preferences (209) for the media application. The media application may access the infotainment system (101c) of the vehicle (100). The media application may play songs based on a location of the vehicle (100). Likewise, the driver/occupant may have subscribed to the plurality of third-party applications. In this example, the data from the vehicle (100) may include the location, and the content may be the media provided to the HMI (101). The content delivering system (103) may also receive the data related to the environment around the vehicle and the traffic around the vehicle from the one or more databases (105a, . . . 105n).

In an embodiment, a context of the content may be determined using existing techniques. For example, when the received content is related to displaying puncture shops nearby location of the vehicle (100), the context generator (214) may analyse the content and determine that the content is related to displaying puncture shops to the driver. Likewise, the context generator (214) may determine if the data is related to offers provided on shopping malls nearby location of the vehicle (100).

At step (302), determining, by the content delivery system (103), a driver distraction score for the content based at least on the received data and one or more driver distraction rules (210) defined by the OEM. In an embodiment, the driver distraction score calculator (215) may be configured to determine the driver distraction score for the content to be provided to the HMI (101). The driver distraction score calculator (215) may use the data received from the vehicle (100), the data received from the one or more databases (105a, . . . 105n) and the driver distraction rules (210) to determine the score. The driver distraction score may indicate an amount of distraction which will be caused to the driver while paying attention to the content. Further, the driver distraction score calculator (215) may also receive information about the HMI (101) which causes distraction to the driver. For example, the HUD (101a) may not cause much distraction as driver need not rotate the head while driving to see the content displayed on the HUD. However, the driver may need to rotate the head while driving to see the content displayed on the infotainment system (101c). Hence, the distraction caused by the infotainment system (101c) may be more compared to the distraction caused by the HUD (101a). Further, driver distractions score calculator (215) may consider the driver distraction rules (210) to determine the distraction which may be experienced by the driver.

At step (303), creating, by the content delivery system (103), a content package for the content, suitable for delivering to the HMI (101) based on the driver distraction score and the received data. In an embodiment, the content package may be suitable for delivering to the HMI (101). For example, the content received from the third-party application server (104) may be parsed according to the dimensions of the HUD (101a). Another example may include, content received from the third-party application server (104) in a mp4 format, and the dynamic content creator may format the audio content to mp3 format supported by audio system of the vehicle (100). In an embodiment, the dynamic content creator (216) may create the content package when the driver distraction score is below a threshold value. For example, when the driver distraction score is below a value of 5 on a scale of 1-10, the content package is created. The driver distraction score being below the threshold value indicates that the content to be delivered to the HMI (101) may not distract the driver excessively. In an embodiment, the content package may be created based on the context of the content also. For example, when the context of the content may indicate a severe situation, the content package may be created, even if it may distract the driver. Therefore, a relative score may be generated by considering the driver distraction score and the context of the content. For example, a content such as displaying nearby service centres may be distracting to the user in general. However, when a tyre of the vehicle (100) is busted, the content is required to be displayed to the driver.

At step (304), assigning, by the content delivery system (103), a priority score to the content package based on a type of the event. When the content is related to an event having a higher severity, a higher priority may be provided to the content package created for the content. Further, the priority score may be assigned also based on an importance score set by the third-party applications server (104) to the content and an importance score associated with a plurality of third-party content provided by the plurality of third-party servers and a relative comparison between the importance score of the content and the importance score of the plurality of contents for assigning the priority score to the content package. In an embodiment, the third-party application server (104) may set the importance score to the content based at least on a type of content, target HMI, and one or more application rule defined by the third-party application server (104). For example, when there are five content packages to be provided to the HMI (101), each of the five content packages carry an importance score set by respective third-party application servers. A relative importance score comparison between the five content packages may be used to assign the priority score.

In an embodiment, the delivery score may be determined for the content package based at least on the priority score associated with the content package, a current content present in the HMI, the user preferences and the received data. The delivery score may be determined to deliver the content package appropriately to the target HMI (101). For example, when there are two content packages (low fuel notification and offers) to be delivered to the infotainment system (101*c*), then the delivery score may be calculated for each of the two content packages. The low fuel notification content may be associated with a high priority score compared to the offers content. The low fuel notification content may be provided with a higher delivery score compared to the offers content. Thus, the offers content may be queued until the low fuel notification is displayed. Likewise, a plurality of content packages may be queued based on respective delivery score. In an embodiment, the delivery score may be determined based on a current content on the HMI (101). For example, a weather report being displayed on the HUD (101*a*) has lower priority than the engine heating alert, which has to be provided to the HUD (101*a*), then the weather report may be stopped and the engine temperature alert may be displayed on the HUD (101*a*).

In an embodiment, the content delivery system (103) may encrypt the content package. The vehicle (100) may generate a unique session ID for each session (engine start time to engine off time). The content delivery system (103) may encrypt the content package with a unique third-party content provided hash value and provide the encrypted data to the OEM server (102). The OEM server (102) may decrypt the encrypted content package to retrieve information regarding target HMI (101), and the priority score. However, the OEM server (102) may not be able to decrypt the original content (data provided by the third-party application server (104)). Based on the target HMI (101) and the priority score, the OEM server (102) may encrypt the content package with the transmit the unique third-party content provided hash and transmit to the vehicle (100) over the network. The vehicle (100) may receive the content package and may decrypt the content package using the unique session ID to access the contents.

Figure 4:
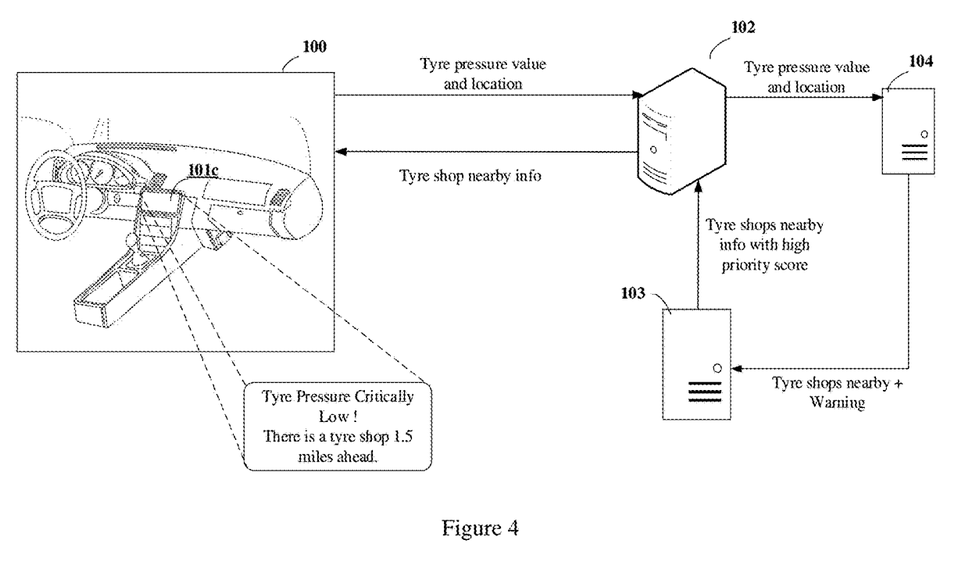
FIG. 4 is illustrative of an example of delivering content on an infotainment system of a vehicle, in accordance with an embodiment of the present disclosure.

FIG. 4 is an exemplary illustration of delivering content to the infotainment system (101*c*) of the vehicle (100). As shown in FIG. 4, the third-party application server (104) receives the tyre pressure value and location information from the OEM server (102) which is provided by the vehicle (100). The third-party application server (104) may be configured to provide services including indicating nearby tyre shops based on the tyre condition and the location of the vehicle (100). In the exemplary scenario illustrated in FIG. 4, the third-party application server (104) monitors the tyre pressure and identifies that the tyre pressure is critically low. Further, the third-party application server (104) determines the location of the vehicle (100) and identifies nearby tyre shops, Thereafter, the third-party application server (104) may create a content comprising a warning regarding the low tyre pressure and the nearby tyre shops. The content may be targeted to be delivered to the infotainment system (101*c*). The created content is provided to the content delivery system (103). The content delivery server (103) receives from the OEM server (102), the data obtained from vehicle (100) and the data obtained from the one or more databases (105*a*, . . . 105*n*). The content delivery system (103) receives the warning information and the nearby tyre shops information from the third-party application server (104). Further, the content delivery server (103) receives the data (204) and determines a driver distraction score. In this example, let us consider that that driver distraction score is 3 on a scale of 1-10 and a threshold value being 5. As the driver distraction score is below the threshold value, the content package is created. The content package may be created according to the requirements of the infotainment system (101*c*). Further, the priority score is assigned. For example, the priority score may be assigned as 8 on a scale of 1-10, indicating a high priority compared to other content packages that have to be delivered to the HMI (101). Further, the high-priority content package is provided to the OEM server (102) for delivering to the vehicle (100). In an embodiment, the delivery score may be determined by the content delivery system (103) or the OEM server (102). In this example, the OEM server (102) receives the content package from the content delivery system (103) and determines the delivery score. In the scenario of FIG. 4, the OEM server (102) determines a network status, a current application running on the infotainment system (101*c*) and information from other applications to be delivered to the infotainment system (101*c*) (e.g., offers nearby, tourist places, restaurants). Based on the above parameters, the OEM server (102) determines the delivery score and may place the content in a first position of a queue to be delivered to the infotainment system (101*c*). Thereafter, the content is delivered to the infotainment system (101*c*) of the vehicle (100) and is displayed as shown in FIG. 4.

Figure 5:
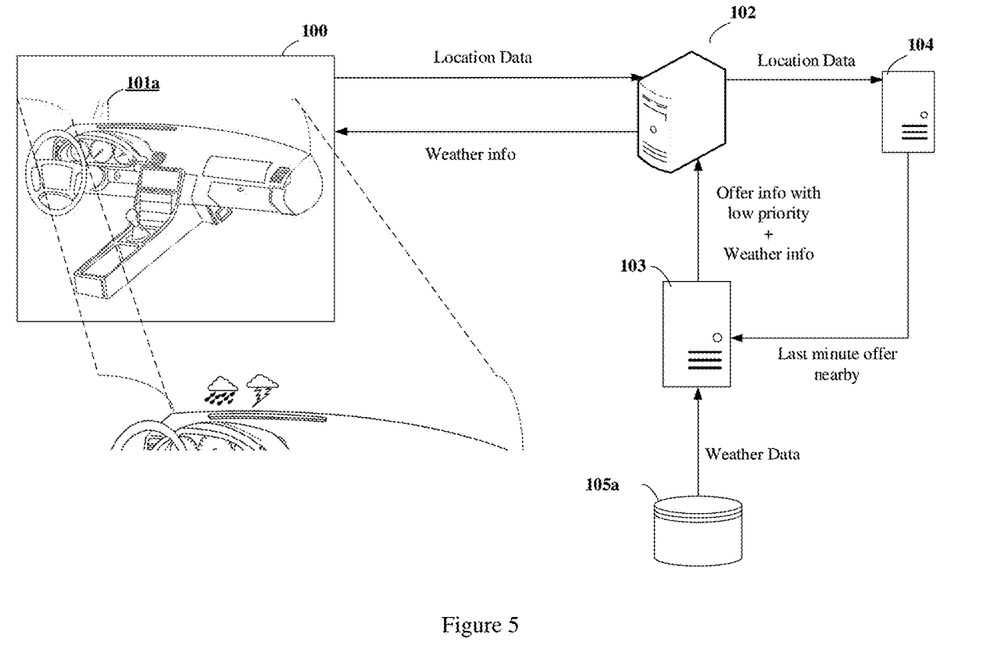
FIG. 5 is illustrative of an example of delivering content on HUD of a vehicle, in accordance with an embodiment of the present disclosure.

FIG. 5 is an exemplary illustration of delivering content to the HUD (101*a*) of the vehicle (100). As shown in FIG. 5, the third-party application server (104) receives the location information from the OEM server (102) which is provided by the vehicle (100). The third-party application server (104) may be configured to provide services including offers nearby based on the location of the vehicle (100). In the exemplary scenario illustrated in FIG. 5, the third-party application server (104) monitors the location and identifies offers that are nearby location of the vehicle (100). Thereafter, the third-party application server (104) may create a content comprising offers nearby location of the vehicle (100). The content may be targeted to be delivered to the HUD (101*a*). The created content is provided to the content delivery system (103). The content delivery server (103) receives from the OEM server (102), the data obtained from vehicle (100) and the data obtained from the one or more databases (105*a*, . . . 105*n*). In an embodiment, a weather database (e.g., 105*a*) may indicate a presence of a storm nearby the vehicle. Further, the content delivery system (103) receives the offers information from the third-party application server (104). The content delivery server (103) determines a driver distraction score for the offers' information. In this example, let us consider that that driver distraction score is 4 on a scale of 1-10 and a threshold value being 5. As the driver distraction score is less than the threshold value, the content package may be created. The content package may be created according to the requirements of the HUD (101*a*). Further, the priority score is assigned. For example, the priority score may be assigned as 2 on a scale of 1-10, indicating a low priority that has to be delivered to the HMI (101). The content delivery system (103) may generate another content package for the weather information having a high priority. Further, the low priority offers information along with the high priority weather information is provided to the OEM server (102) for delivering to the vehicle (100). The OEM server (102) receives the content packages (offers information and weather information) from the content delivery system (103) and determines the delivery score. In the scenario of FIG. 5, the OEM server (102) determines a network status, a current application running on the infotainment system (101c) and information from other applications to be delivered to the infotainment system (101c). Based on the above parameters, the OEM server (102) determines the delivery score and may place the weather information in a first position of a queue and the offers information placed subsequent to the first position of the queue, to be delivered to the HUD (101a). Thereafter, the content is delivered to the HUD (101c) of the vehicle (100) and is displayed as shown in FIG. 5.

Figure 6:
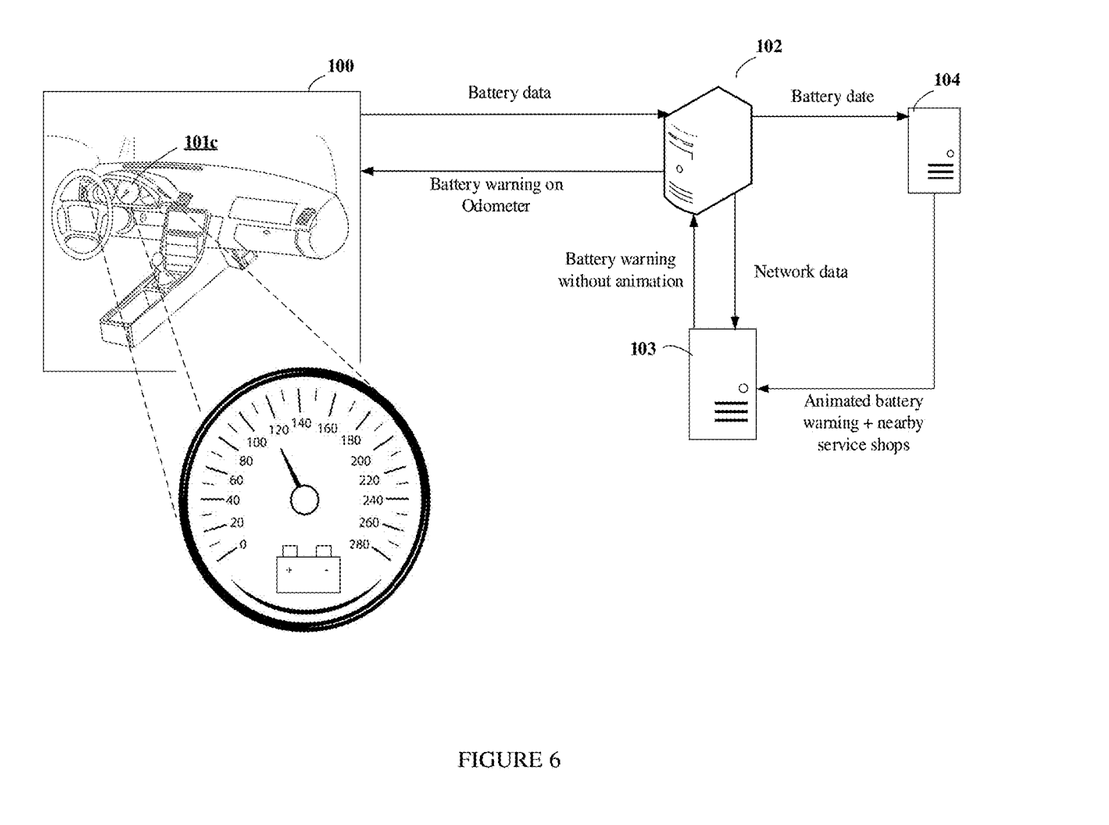
FIG. 6 is illustrative of an example of delivering content on odometer of a vehicle, in accordance with an embodiment of the present disclosure.

FIG. 6 is an exemplary illustration of delivering content to the odometer (101c) of the vehicle (100). As shown in FIG. 6, the third-party application server (104) receives the battery information from the OEM server (102) which is provided by the vehicle (100). The third-party application server (104) may be configured to provide services including indicating battery health of the vehicle (100) and service stations nearby based on the battery health. In the exemplary scenario illustrated in FIG. 6, the third-party application server (104) monitors the battery health of the vehicle (100) and may create a suitable content (animated content and nearby service shops) to display the that the battery health is deteriorating, on the infotainment system (101b). The created content is provided to the content delivery system (103). The content delivery server (103) receives from the OEM server (102), the data obtained from vehicle (100) including a network bandwidth between the vehicle (100) and the OEM server (102). In the exemplary embodiment of FIG. 6, the content delivery system (103) determines that the network bandwidth is less. Hence, the content delivery system (103) may discard the animated content created by the third-party application server (104) and may provide only the information regarding the deteriorating battery health to the OEM server (102) to be provided to the HMI (101). The OEM server (102) further determines the type of content and provides the information on the odometer, as the odometer typically comprises an warning indication regarding battery condition.

The present disclosure provides a method and a system that delivers third-party content to the HMI (101) of the vehicle (100) based on context of the content and a driver distraction score. Hence, the present disclosure discloses providing safety to the driver while delivering the content to the HMI (101) of the vehicle (100). Further, the content delivered are optimized according to the context and requirements of the HMI (101) of the vehicle. Hence, even when a content is being displayed on an infotainment system, an important notification is not missed, and the driver is indicated of a critical situation.

Computer System

Figure 7:
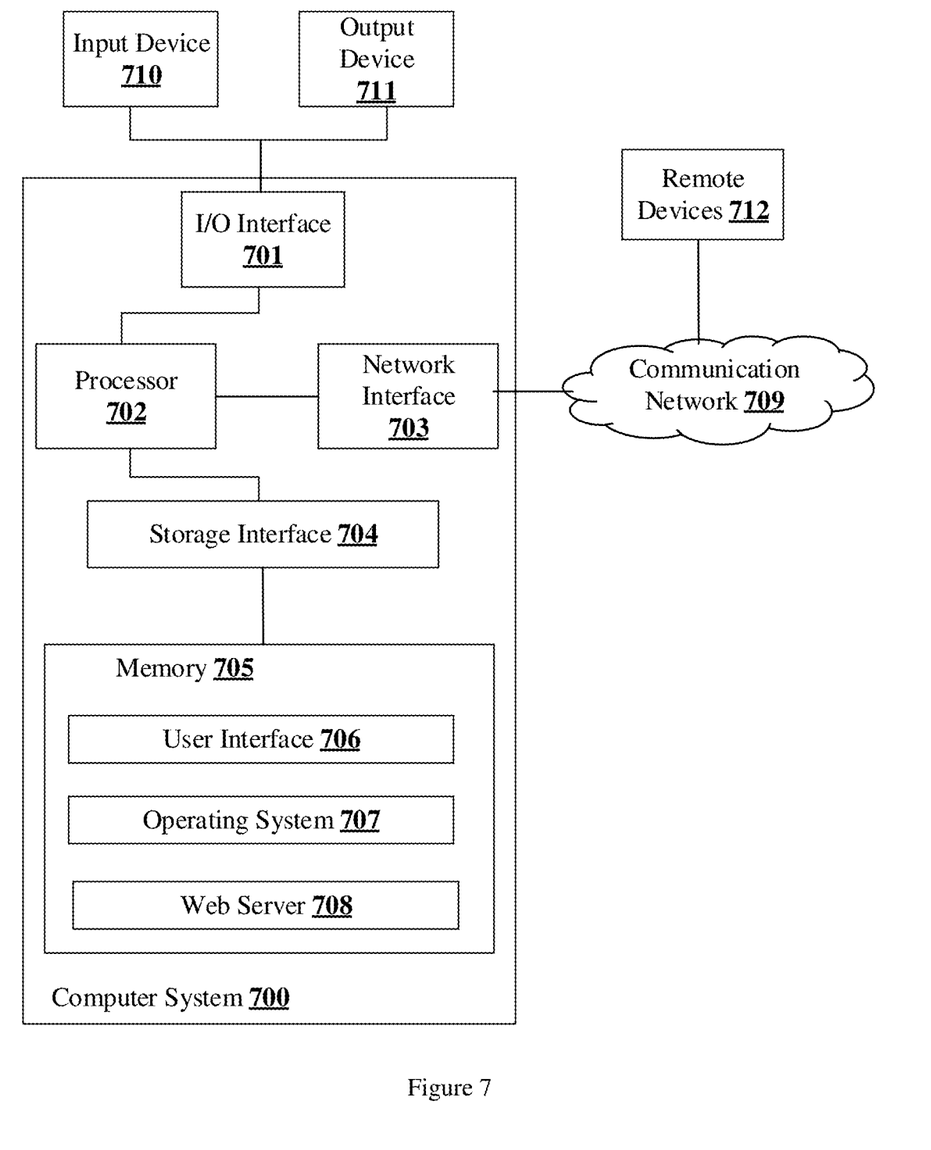
FIG. 7 is a block diagram of a general-purpose computer capable of delivering content to HMI of a vehicle, in accordance with an embodiment of the present disclosure.

FIG. 6 illustrates a block diagram of an exemplary computer system (700) for implementing embodiments consistent with the present disclosure. In an embodiment, the computer system (700) is used to implement the method for adaptive streaming of multimedia data. The computer system (700) may comprise a central processing unit ("CPU" or "processor") 402. The processor (702) may comprise at least one data processor for executing program components for dynamic resource allocation at run time. The processor (702) may include specialized processing units such as integrated system (bus) controllers, memory management control units, floating point units, graphics processing units, digital signal processing units, etc.

The processor (702) may be disposed in communication with one or more input/output (I/O) devices (not shown) via I/O interface (701). The I/O interface (701) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (701), the computer system 400 may communicate with one or more I/O devices. For example, the input device (710) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 411 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (700) is connected to the service operator through a communication network (709). The processor (702) may be disposed in communication with the communication network (709) via a network interface (703). The network interface (703) may communicate with the communication network (709). The network interface (703) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (709) may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (703) and the communication network (709), the computer system 400 may communicate with the one or more service operators.

In some embodiments, the processor (702) may be disposed in communication with a memory (705) (e.g., RAM, ROM, etc. not shown in FIG. 5) via a storage interface (704). The storage interface (704) may connect to memory (705) including, without limitation, memory drives, removable disc drives, etc., employing connection protocols such as serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (705) may store a collection of program or database components, including, without limitation, user interface (706), an operating system (707), web server (708) etc. In some embodiments, computer system (700) may store user/application data (706), such as the data, variables, records, etc. as described in this disclosure. Such databases may be implemented as fault-tolerant, relational, scalable, secure databases such as Oracle or Sybase.

The operating system (707) may facilitate resource management and operation of the computer system (700). Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, 10 etc.), Apple iOS, Google Android, Blackberry OS, or the like.

In some embodiments, the computer system (700) may implement a web browser (708) stored program component. The web browser (708) may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers (708) may utilize facilities such as AJAX, DHTML, Adobe Flash, JavaScript, Java, Application Programming Interfaces (APIs), etc. In some embodiments, the computer system (700) may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system (700) may implement a mail client stored program component. The mail client may be a mail viewing application, such as Apple Mail, Microsoft Entourage, Microsoft Outlook, Mozilla Thunderbird, etc. Remote devices (712) may be connected to the computer system (700). The remote devices may include third-party application servers, OEM servers, and one or more databases.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4, FIG. 5, FIG. 6, FIG. 7 and FIG. 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method of delivering content to a Human Machine Interface (HMI) of a vehicle, the method comprising:
    receiving, by a content delivery system, a content from a third-party application server among a plurality of third-party application servers for delivering to a HMI of the vehicle, and data related to at least the HMI of the vehicle, an environment around the vehicle, a network associated with the vehicle, user preferences and measurements made by one or more sensors in the vehicle from an Original Equipment Manufacturer (OEM) server, when an event occurs;
    determining, by the content delivery system, a driver distraction score for the content based at least on the received data and one or more driver distraction rules defined by the OEM, wherein the one or more driver distraction rules are generated dynamically based on a current situation if the current situation is absent in pre-defined driver distraction rules;
    creating, by the content delivery system, a content package for the content, suitable for delivering to the HMI of the vehicle, based on the driver distraction score and the received data;
    assigning, by the content delivery system, a priority score to the content package based on a type of the event; and
    delivering, by the content delivery system, the content package to the vehicle for displaying on the HMI based on the priority score.

2. The method of claim 1, wherein the data related to the HMI comprises least one of, dimensions of the HMI, a type of the HMI, features of the HMI, and availability of the HMI.

3. The method of claim 1, wherein the data related to the environment comprises a weather condition around the vehicle, a traffic condition around the vehicle, a road condition.

4. The method of claim 1, wherein the data related to the network comprises a type of network, a bandwidth of the network, a latency of the network, and a number of channels in the network.

5. The method of claim 1, wherein the user preferences comprises at least one of, a type of content preferred by the user, a preference regarding the type of HMI, an amount of content, time slots for delivering the content on the HMI, a priority of content set by the user, and permissions for each of a plurality of third-party applications to access the HMI of the vehicle.

6. The method of claim 1, wherein the measurements made by the one or more sensors comprises, acceleration of the vehicle, speed of the vehicle, vehicle braking, vehicle swerves, and a location of the vehicle.

7. The method of claim 1, wherein the driver distraction score is determined based on monitoring a driver of the vehicle, the one or more rules, and the received data.

8. The method of claim 1, wherein the content package is created when the driver distraction score is below a threshold value.

9. The method of claim 1, wherein assigning the priority score further comprises:
  determining an importance score set by the third-party application server to the content and an importance score associated with a plurality of third-party content provided by the plurality of third-party application servers; and
  assigning the priority score to the content package based on a comparison between the importance score of the content and the importance score of the plurality of content.

10. The method of claim 1, wherein delivering the content package to the HMI comprises:
  determining a delivery score for the content package based at least on the priority score associated with the content package, a current content present in the HMI, the user preferences and the received data.

11. A content delivery system for delivering content to a Human Machine Interface (HMI) of a vehicle, comprising:
  one or more processors; and
  a memory communicatively connected to the one or more processors, for storing processor executable instructions, which, on execution causes the one or more processors to:
    receive a content from a third-party application server among a plurality of third-party application servers for delivering to a HMI of the vehicle, and data related to at least the HMI of the vehicle, an environment around the vehicle, a network associated with the vehicle, user preferences and measurements made by one or more sensors in the vehicle from an Original Equipment Manufacturer (OEM) server, when an event occurs;
    determine a driver distraction score for the content based at least on the received data and one or more driver distraction rules defined by the OEM, wherein the one or more driver distraction rules are generated dynamically based on a current situation if the current situation is absent in pre-defined driver distraction rules;
    create a content package for the content, suitable for delivering to the HMI of the vehicle, based on the driver distraction score and the received data;
    assign a priority score to the content package based on a type of the event; and
    deliver the content package to the vehicle for displaying on the HMI based on the priority score.

12. The content delivery system of claim 11, wherein the one or more processors are configured to determine the driver distraction score based on monitoring a driver of the vehicle, the one or more rules, and the received data.

13. The content delivery system of claim 11, wherein the one or more processors are configured to create the content package when the driver distraction score is below a threshold value.

14. The content delivery system of claim 11, wherein the one or more processors are configured to assign the priority score by:
  determining an importance score set by the third-party server to the content; and
  determining the priority score based on the importance score of the content and an importance score associated with a plurality of third-party content provided by the plurality of third-party servers.

15. The content delivery system of claim 11, wherein the one or more processors are configured to deliver the content package to the HMI by:
  determining a delivery score for the content package based at least on the priority score associated with the content package, a current content present in the HMI, the user preferences and the received data.

16. A non-transitory computer readable medium including instructions stored thereon that when processed by at least one processor cause a device to perform operations comprising:
  receive a content from a third-party application server among a plurality of third-party application servers for delivering to a HMI of the vehicle, and data related to at least the HMI of the vehicle, an environment around the vehicle, a network associated with the vehicle, user preferences and measurements made by one or more sensors in the vehicle from an Original Equipment Manufacturer (OEM) server, when an event occurs;
  determining a driver distraction score for the content based at least on the received data and one or more driver distraction rules defined by the OEM, wherein the one or more driver distraction rules are generated dynamically based on a current situation if the current situation is absent in pre-defined driver distraction rules;
  creating a content package for the content, suitable for delivering to the HMI of the vehicle, based on the driver distraction score and the received data;
  assigning a priority score to the content package based on a type of the event; and
  delivering the content package to the vehicle for displaying on the HMI based on the priority score.

* * * * *